(12) United States Patent
Costello

(10) Patent No.: US 7,109,601 B2
(45) Date of Patent: Sep. 19, 2006

(54) BRAKE BY WIRE POWER SOURCE

(75) Inventor: Robert E. Costello, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 484 days.

(21) Appl. No.: 10/288,972

(22) Filed: Nov. 6, 2002

(65) Prior Publication Data

US 2004/0084963 A1    May 6, 2004

(51) Int. Cl.
*B60L 1/00* (2006.01)
*B60L 3/00* (2006.01)
*B60T 7/02* (2006.01)

(52) U.S. Cl. ....................................... 307/9.1
(58) Field of Classification Search ................. 307/9.1, 307/73, 76
See application file for complete search history.

(56) References Cited

U.S. PATENT DOCUMENTS 6,364,432 B1 * 4/2002 Mixon ......................... 303/124
6,668,225 B1 * 12/2003 Oh et al. ....................... 701/70
2001/0058544  * 12/2001 Walker ....................... 713/200
2002/0095251 A1 * 7/2002 Oh et al. ....................... 701/70

FOREIGN PATENT DOCUMENTS

JP    2003/220946   * 8/2003

* cited by examiner

Primary Examiner—Brian Sircus
Assistant Examiner—Hal I. Kaplan
(74) Attorney, Agent, or Firm—Carlson, Gaskey & Olds

(57) ABSTRACT

An electric trailer brake system includes an electric brake receiving energy from a battery. The battery is recharged by a generator disposed on the trailer independent from the towing vehicle. Recharging the batteries that power the electric brake assemblies on the trailer minimizes the effects of power restrictions caused by a standard sized connector and cable connection between the towing vehicle and cargo trailer.

16 Claims, 4 Drawing Sheets

BRAKE BY WIRE POWER SOURCE

BACKGROUND OF THE INVENTION

This invention relates to an electric brake system for a cargo trailer and specifically to a power source for powering an electric brake system for a cargo trailer.

Typically, heavy trucks include a truck and a cargo trailer. The truck includes an internal combustion engine that drives an alternator to generate electricity. Electric brakes mounted to the tractor are powered directly by electricity generated from the alternator. Typically, a single electric brake requires approximately 20 to 30 amperes of current during heavy stop conditions in order to have enough power to slow or stop the heavy truck. Wire sizes for transmitting electrical energy between the power source for the truck and the electric brake are sized to reduce line drop so the brake will have required voltage and current for the brake motor. There are restrictions on the size of wire used between the truck and trailer for transmitting electrical power to the electric brakes. Further, the electrical connection between the truck and trailer is a predetermined standard size wire and connector.

The size of the wire and the standard connector cannot be adjusted and is the limiting factor for current supplied to the electric brakes in the non-powered trailer. As appreciated an electric brake on each wheel of the cargo trailer requires approximately 20 to 30 amperes of current in order to apply sufficient braking force during a hard stop condition. The current required for all the wheels of the cargo trailer is between 360 and 440 amperes when the brakes are fully applied for a hard stop. Current losses caused by line drop through the standard sized wire and connector are such that during hard stop braking conditions the amount of available current may be insufficient to actuate the electric brakes.

Accordingly, it is desirable to provide a system for powering electric brakes mounted to the cargo trailer independent of power generated by the towing vehicle to minimize the limitations caused by the electrical connection between the truck and trailer.

SUMMARY OF THE INVENTION

This invention is an electric brake system for a cargo trailer including a power source independent of a powered tow vehicle for powering electric brake assemblies of the cargo trailer.

The electric brake system of the trailer includes an electric brake assembly mounted for braking each of the non-driven wheels of the trailer. Each electric brake assembly is connected to a battery charged by a generator driven by the axles or wheels of the cargo trailer.

The electric brake assembly includes a brake controller in communication with a power source. The brake controller monitors the battery and controls the generator charging the batteries that power each electric brake assembly.

In another embodiment of this invention the power source is a fuel cell that directs power to each of the electric brake assemblies on a demand basis or to a power storage device. In yet another embodiment of this invention, a solar panel is positioned to trickle charge the batteries that power each of the electric brake assemblies.

Accordingly, the electric brake system of this invention includes a power source independent of the towing vehicle to provide sufficient electrical energy for the electric brakes of the trailer to operate without increasing or changing the standard electrical connection between the powered tow vehicle and the cargo trailer.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
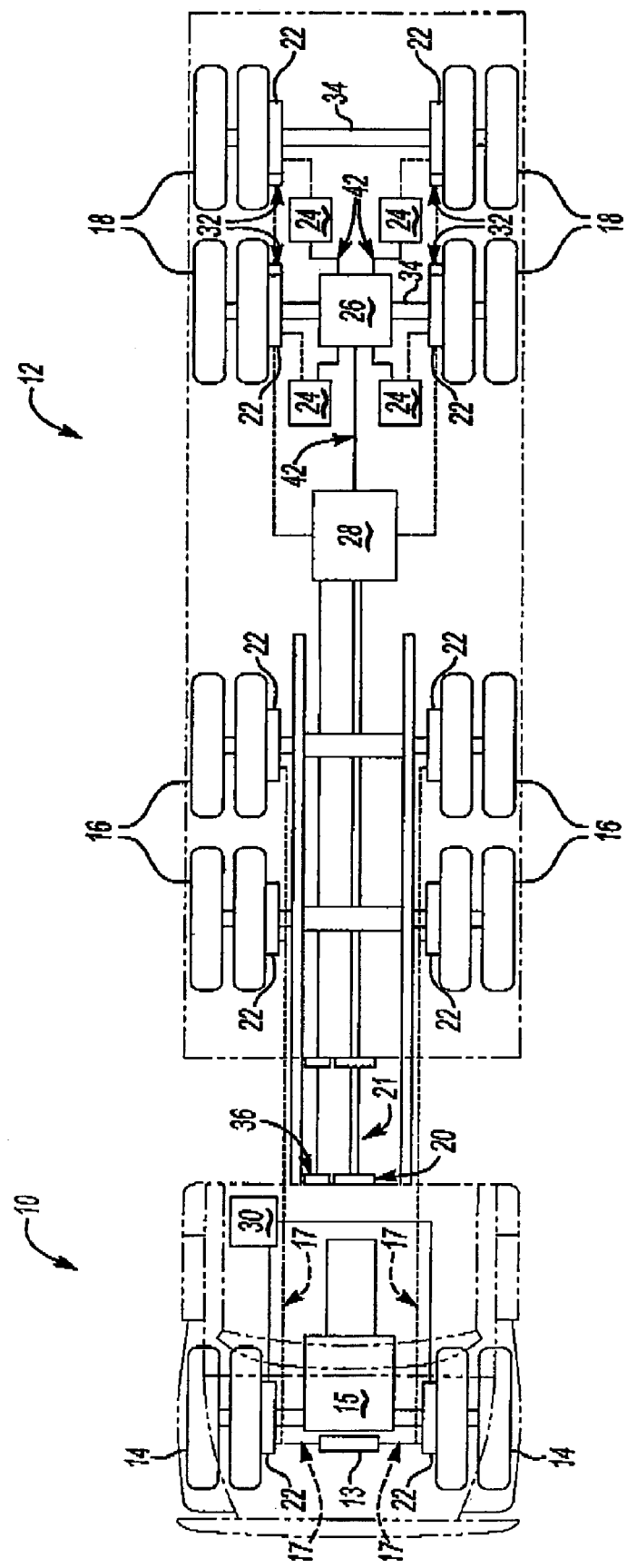
FIG. 1 is a schematic representation of a tractor trailer including an electric braking system for a cargo trailer.

Referring to FIG. 1 wherein like reference numerals designate similar arts throughout the figures, this invention is an electric brake system for a cargo trailer towed by a towing vehicle 10. The electric brake system comprises electric brake assemblies 22 disposed at each wheel of the tow vehicle 10 and the cargo trailer 12. Electric brakes on the towing vehicle 10 are directly powered by an engine 15 driving an alternator 13, as is the typical configuration for motor vehicles. The wire size of the power connections 17 is sized to minimize voltage drop between the alternator 13 and brake assemblies 22. The specific wire size of the power connections 17 may be of any size as is known by a worker skilled in the art to prevent current loss and assure that sufficient amounts of electrical energy reach each electric brake assembly 22.

Electrical energy from the towing vehicle 10 is transferred to the cargo trailer 12 through a standard sized connector 20 and cable 21. The cargo trailer 12 receives power through a fixed wire size seven-pin J560 connector and a J1067 cable. This standard combination of connector 20 and cable 21 is sized to supply sufficient power to operate taillights. Anti-lock braking system and any other systems disposed on the cargo trailer 12. The electric brake system requires an additional 80 to 160 amperes of current. The increased requirement for electrical energy in the cargo trailer 12 magnifies the effects of any current loss. The electric brake system of this invention includes an alternate independent power source located on the cargo trailer 12 in order to assure sufficient electrical energy for electric brake assemblies 22. Data is exchanged between the controller 28 and main controller 30 through a power line carrier 36. Information through the power line carrier 36 includes information on brake conditions, power source condition, brake wear, temperature and other required data to the main controller 30.

Each electric brake assembly 22 is powered by a separate battery 24. Each battery 24 is trickle charged controlled by controller 28 from the alternator 13 of the towing vehicle 10 to maintain sufficient electrical charge for operation of the electric brake assemblies 22. However, because of the current loss between the alternator 13 and each battery 24 disposed within the cargo trailer 12, a generator 26 positioned on the cargo trailer 12 also provides electrical energy to constantly charge the batteries 24 in order to maintain requisite electrical charge for hard stopping of the towing vehicle 10 and cargo trailer 12.

The generator 26 is driven by rotating members of the cargo trailer 12, such as the trailer wheels 18 or the trailer axle 34. The generator 26 is driven by the rotation of the wailer wheels 18 and can be mechanically connected to any of the rotating members such as the axle 34 or the trailer wheels 18. The generator 26 is also in electrical communication with and controlled by controller 28. The generator 26 is selectively engaged to operate in response to a specific energy level within each of the batteries 24. Each of the electric brake assemblies 22 include a brake controller 32 that controls actuation and monitors energy levels within the battery 24. Upon attaining a predetermined energy level, the brake controller 32 signals the need for additional energy, the controller 28 signals the generator 26 to engage and produce additional electrical energy to recharge the batteries 24.

Figure 2:
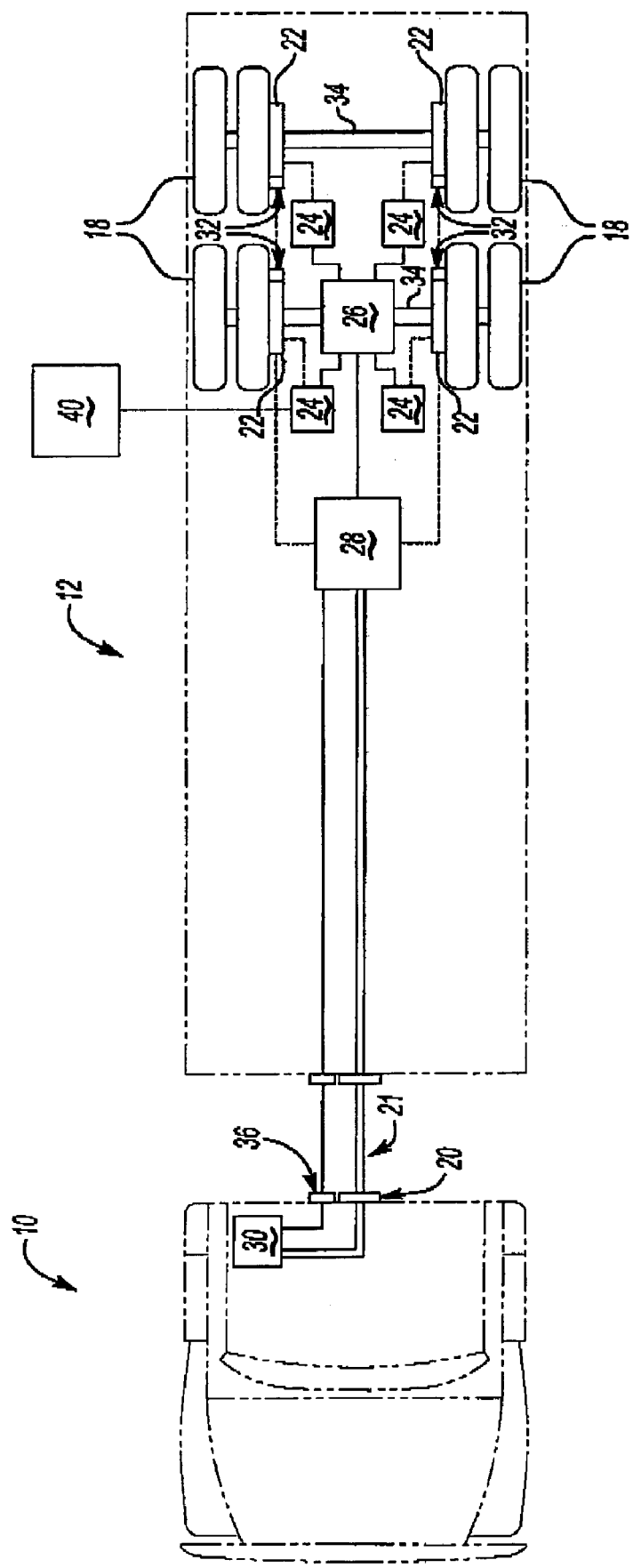
FIG. 2 is a schematic representation of an alternate embodiment of the electric braking system.

Referring to FIG. 2, another embodiment of this invention includes a solar panel 40 to supplement the power produced by the generator 26 to charge the batteries 24. Solar panels 40 provide continuous electrical charge to the batteries 24 even in the absence of movement of the cargo trailer 12. Each electrical brake assembly 22 is provided with the individual battery 24 that includes sufficient electrical energy for a desired number of hard stops. The cargo trailer mounted generator 26 supplements trickle charging provided by power from the alternator 13 (FIG. 1). The solar panel 40 operates to maintain the desired level of charge to power the electric brakes 22 even daring stationary periods.

Figure 3:
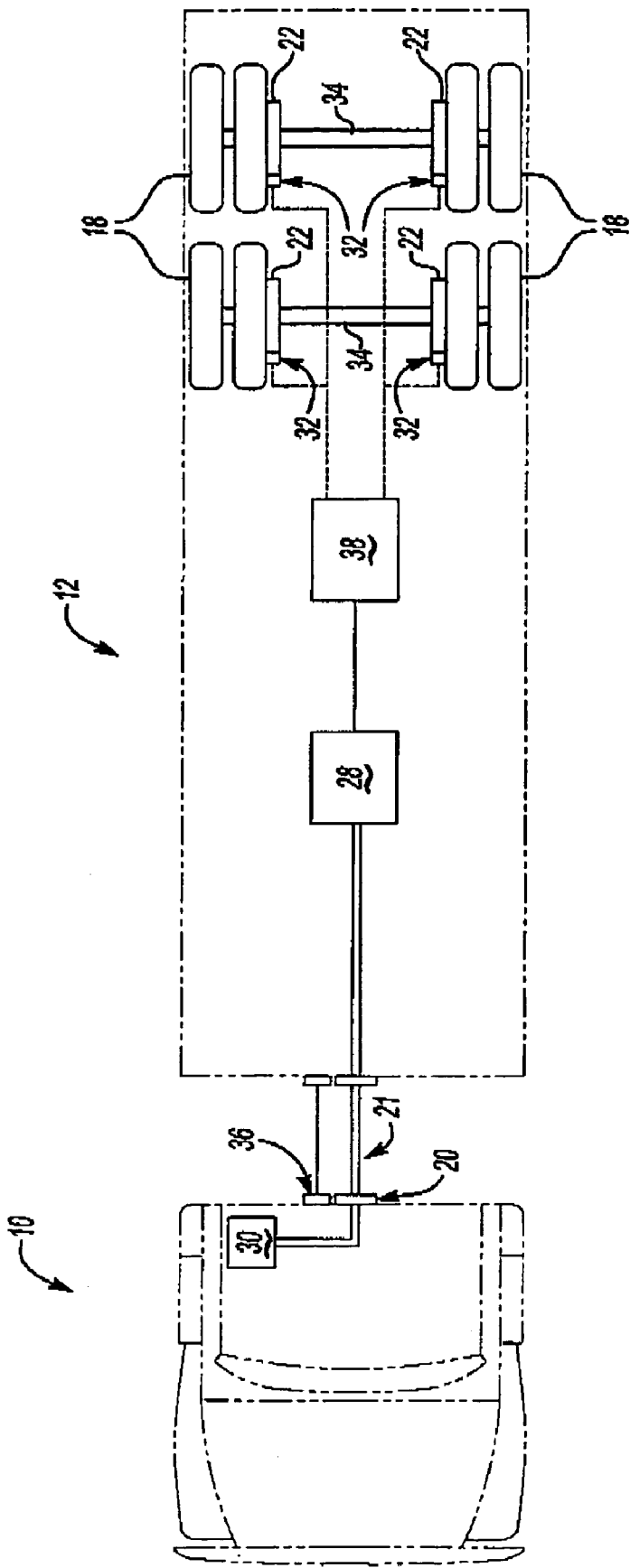
FIG. 3 is a schematic representation of another embodiment of the electrical braking system and FIG. 4 is a schematic representation of another embodiment of the electric braking system with a second trailer.

Referring to FIG. 3, another embodiment of this invention includes a fuel cell 38 for powering the electric brake assemblies 22. The fuel cell 38 converts chemical energy to electrical energy as required by each of the electric brake assemblies 22. The specific type of fuel cell 38 utilized in the electric brake system is application specific and any type or configuration of fuel cell is within the contemplation of this invention. Many types of fuel cells using different chemical components and configurations are within the contemplation of this invention.

This invention is an alternate independent power source for powering and charging the electric brake assemblies 22 disposed within the cargo trailer 12. Although, specific types of power sources are described, it is within the contemplation of this invention that other power generation means known to a worker skilled in the art for supplying electrical energy to actuate the electric brake assemblies 22 are within the scope of this invention.

Figure 4:
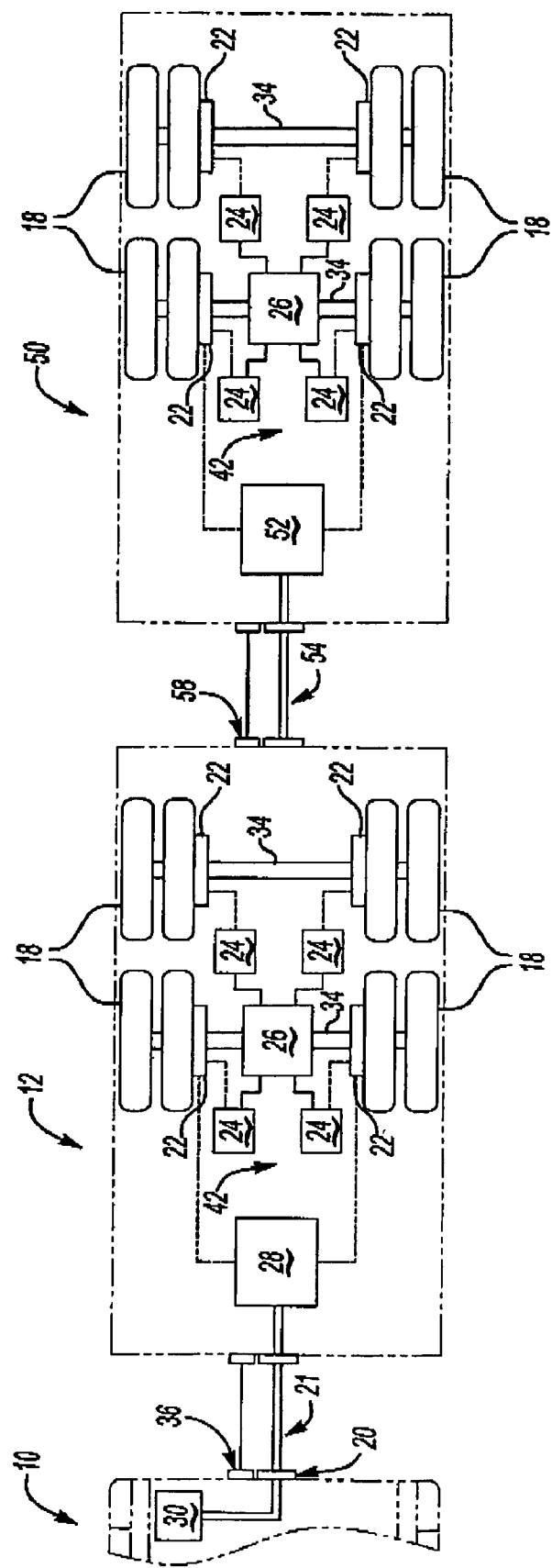

Referring to FIG. 4, a second trailer 50 is towed by the cargo trailer 12. As appreciated, the current drop from the towing vehicle 10 to the cargo trailer 12, and then to the second trailer 50 is such that sufficient electrical energy would not be available to actuate the electric brake assemblies 22 of the second trailer 50. The system of this invention includes the generator 26 to provide additional electric energy to the batteries 24 that power actuation of the electric brake assemblies 22. The second trailer 50 includes a second controller 52 and power cable 54 that is in communication with the controller 28. Further, a second power line cater 58 communicates information on brake system status to a main controller 30 (FIG. 1). As appreciated, the second trailer 50 may also include alternate energy storage or producing devices such as the fuel cell 38 and the generator 26.

Referring back to FIG. 1, during operation, the towing vehicle 10 supplies current to electric brake assemblies 22 disposed at driven wheels 16 and non-driven wheels 14. The main controller 30 is in communication with the trailer controller 28. Communication between the main controller 30 and controller 28 actuates and controls actuation of the electric brake assemblies 22 at each of the trailer wheels 18.

The main controller 30 controls actuation of the electric brake assemblies 22 Electrical energy for powering and actuating the electric brake assemblies 22 comes from the batteries 24 disposed on the trailer 12. The alternator 13 of the towing vehicle provides a continuous trickle charge to the batteries of the cargo trailer 12. The trickle charge provided by the alternator 13 is not sufficient to assure required power levels to actuate the electric brake assemblies 22. Further, the standard sized connector 20 and cable 21 causes a large current drop that in some cases can cause insufficient power to be transferred to the electric brake assemblies 22.

The generator 26 provides additional energy to charge the batteries 24 independent of the towing vehicle 10. The generator 26 communicates power to the batteries without the limitation of standard connector and wire size. The power transfer lines 42 on the trailer 12 are sized to minimize any instance of current drop without modifying the connector 20 and cable 21. It is within the contemplation of this invention that any power source that is known to a worker skilled in the art can be applied to provide sufficient energy required to operate the electric brake assemblies 22.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An electric brake system for a trailer pulled by a tow vehicle having a primary power-generating device, said electric brake system comprising;
    an electric brake assembly for slowing and stopping the trailer;
    a power storage device mounted to the trailer to provide energy to said electric brake assembly;
    a coupling attachable to communicate a first quantity of energy from the primary power-generating device disposed on the tow vehicle to charge the power storage device;
    a secondary power-generating device disposed on the trailer to communicate a second quantity of energy to said power storage device to supplement said first quantity of energy supplied by the primary power-generating device to charge said power storage device; and
    a controller for controlling said electric brake assembly, said secondary power-generating device and said power storage device.

2. The system of claim 1, wherein said power storage device is a battery.

3. The system of claim 1, wherein said secondary power-generating device is a generator.

4. The system of claim 3, wherein said generator is driven by an axle of the trailer.

5. The system of claim 1, wherein said secondary power-generating device is a fuel cell.

6. The system of claim 1, wherein said secondary power-generating device is a solar cell.

7. The system of claim 1, wherein said controller activates said secondary power-generating device in response to a predetermined energy level of said power storage device.

8. The system of claim 7, including a plurality of electric brake assemblies and corresponding pluralities of brake controllers, and power storage devices.

9. The system of claim 1, wherein said controller is in communication with a main brake controller of the tow vehicle, and said controller forwards brake condition information to said main brake controller.

10. A brake system for a tow vehicle and trailer comprising;
 an electric brake assembly selectively engageable for braking wheels of the trailer;
 a power storage device disposed on the trailer to power said electric brake assembly;
 a primary power-generating device disposed on the tow vehicle and in electrical communication with said power storage device to supply a first quantity of energy to said power storage device;
 a secondary power-generating device disposed on the trailer to provide a second quantity of energy to said power storage device;
 a main controller disposed on the tow vehicle for controlling said electric brake assembly; and
 a secondary controller disposed on the trailer and in communication with said electric brake assembly, said power storage device, said secondary power-generating device and said main brake controller to control said electric brake assembly.

11. The system of claim 10, wherein said power storage device is a battery and said secondary power-generating device is an electric generator driven by rotation of at least one trailer axle.

12. The system of claim 10, wherein said power storage device is a battery and said secondary power-generating device is a solar panel for converting solar energy into electric energy stored in said battery.

13. The system of claim 10, wherein said secondary power-generating device is a fuel cell for supplying electrical energy to said electric brake assembly.

14. An electric brake system for a trailer pulled by a tow vehicle having a primary power-generating device, said electric brake system comprising:
 an electric brake assembly for slowing and stopping the trailer;
 a power storage device mounted to the trailer for powering the electric brake assembly; and
 a secondary power generating device for selectively charging said power storage device.

15. The system as recited in claim 14, including a coupling for communicating a first quantity of energy to charge the power storage device, and said secondary power-generating device provides a second quantity of energy to charge the power storage device.

16. The system as recited in claim 14, wherein said secondary power generation device is a generator driven by an axle of the trailer.

* * * * *